US012680815B2

(12) United States Patent
Miyazaki et al.

(10) Patent No.: US 12,680,815 B2
(45) Date of Patent: Jul. 14, 2026

(54) SENSOR

(71) Applicant: KABUSHIKI KAISHA TOSHIBA, Tokyo (JP)

(72) Inventors: Fumito Miyazaki, Yokohama Kanagawa (JP); Yasushi Tomizawa, Tokyo (JP); Daiki Ono, Yokohama Kanagawa (JP); Hideaki Murase, Yokohama Kanagawa (JP); Kengo Uchida, Kawasaki Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 366 days.

(21) Appl. No.: 18/455,115

(22) Filed: Aug. 24, 2023

(65) Prior Publication Data

US 2024/0288270 A1     Aug. 29, 2024

(30) Foreign Application Priority Data

Feb. 28, 2023     (JP) ................................. 2023-029759

(51) Int. Cl.
G01C 19/5712          (2012.01)

(52) U.S. Cl.
CPC ................................. G01C 19/5712 (2013.01)

(58) Field of Classification Search
CPC ............ G01C 19/5712; G01C 19/5776; G01C 25/005
See application file for complete search history.

(56) References Cited

U.S. PATENT DOCUMENTS 5,969,225  A      10/1999  Kobayashi
2011/0232359  A1*   9/2011  Caron ................... G01C 19/56
                                                73/1.77
(Continued)

FOREIGN PATENT DOCUMENTS

JP          2013-96801 A      5/2013
JP          2020-187018 A     11/2020
(Continued)

OTHER PUBLICATIONS

European patent Office, Extended European Search Report in EP App No. 23192257, 10 pages (May 7, 2024).

*Primary Examiner* — David J Bolduc
(74) *Attorney, Agent, or Firm* — Finnegan, Henderson, Farabow, Garrett & Dunner, LLP

(57)          ABSTRACT
According to one embodiment, a sensor includes a fixed member, a movable member, a first counter electrode, a second counter electrode, a first resistance element, a second resistance element, and a control device. The control device includes a controller. The controller performs a first correction operation in a state where the movable member does not receive an external force. In the first correction operation, the controller causes the movable member to generate a first vibration. In the first correction operation, the controller derives a first correction value based on a first detection result of a first component and a second detection result of a second component. The first correction value includes at least one of a first resistance correction value, a second resistance correction value, a first voltage correction value, or a second voltage correction value such that the movable member vibrates along the first direction.

18 Claims, 2 Drawing Sheets

(56) References Cited

U.S. PATENT DOCUMENTS

| | | | | |
|---|---|---|---|---|
| 2015/0308855 A1* | 10/2015 | Salaun | .................. | G01C 19/56 |
| | | | | 73/1.38 |
| 2020/0363205 A1 | 11/2020 | Gando et al. | | |
| 2021/0381831 A1* | 12/2021 | Gando | .............. | G01C 19/5776 |
| 2022/0276052 A1* | 9/2022 | Hiraga | .............. | G01C 19/5733 |
| 2022/0326013 A1 | 10/2022 | Miyazaki et al. | | |
| 2023/0152097 A1* | 5/2023 | Gando | .............. | G01C 19/5726 |
| | | | | 73/504.12 |
| 2023/0152099 A1* | 5/2023 | Gando | .............. | G01C 19/5642 |
| | | | | 73/504.12 |

FOREIGN PATENT DOCUMENTS

| | | |
|---|---|---|
| JP | 2022-162641 A | 10/2022 |
| WO | WO 2013/051060 A1 | 4/2013 |

* cited by examiner

SENSOR

CROSS-REFERENCE TO RELATED APPLICATIONS

This application is based upon and claims the benefit of priority from Japanese Patent Application No. 2023-029759, filed on Feb. 28, 2023; the entire contents of which are incorporated herein by reference.

FIELD

Embodiments of the invention generally relate to a sensor.

BACKGROUND

For example, there is a sensor with a MEMS (Micro Electro Mechanical Systems) structure. It is desired to improve the accuracy of the sensor.

DETAILED DESCRIPTION

Figure 1:
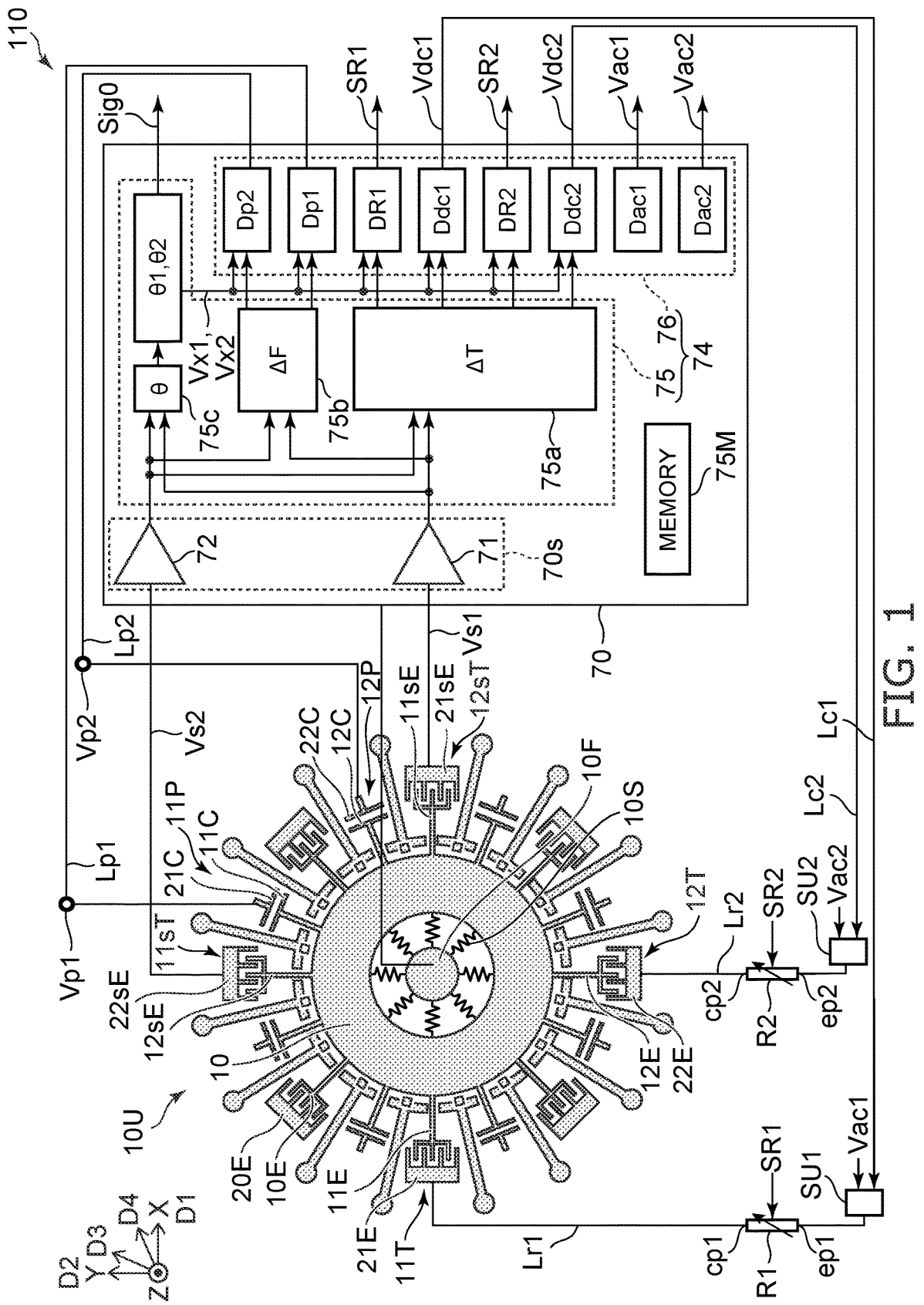
FIG. 1 is a schematic plan view illustrating a sensor according to an embodiment.

According to one embodiment, a sensor includes a fixed member, a movable member, a first counter electrode, a second counter electrode, a first resistance element, a second resistance element, and a control device. The movable member is supported by the fixed member. The movable member includes a first electrode and a second electrode. A first direction from the fixed member to the first electrode crosses a second direction from the fixed member to the second electrode. The first counter electrode faces the first electrode. A position of the first counter electrode with respect to the fixed member is fixed. The first counter electrode and the first electrode form a first comb-teeth electrode pair. The second counter electrode faces the second electrode. A position of the second counter electrode with respect to the fixed member is fixed. The second counter electrode and the second electrode form a second comb-teeth electrode pair. The first resistance element includes a first end and a first other end. The first other end is electrically connected to the first counter electrode. The first resistance element has a first resistance value. The second resistance element includes a second end and a second other end. The second other end is electrically connected to the second counter electrode. The second resistance element has a second resistance value. The control device includes a controller. The controller is configured to apply a first voltage to the first end and a second voltage to the second end. The controller is configured to perform a first correction operation in a state where the movable member does not receive an external force. In the first correction operation, the controller is configured to cause the movable member to generate a first vibration. The first vibration includes a first component in the first direction and a second component in the second direction. In the first correction operation, the controller is configured to derive a first correction value based on a first detection result of the first component and a second detection result of the second component. The first correction value includes at least one of a first resistance correction value for the first resistance value, a second resistance correction value for the second resistance value, a first voltage correction value for the first voltage, or a second voltage correction value for the second voltage such that the movable member vibrates along the first direction.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be Illustrated differently among drawings, even for identical portions.

In the specification and drawings, components similar to those described previously in an antecedent drawing are marked with like reference numerals, and a detailed description is omitted as appropriate.

First Embodiment

FIG. 1 is a schematic plan view illustrating a sensor according to an embodiment.

Figure 2:
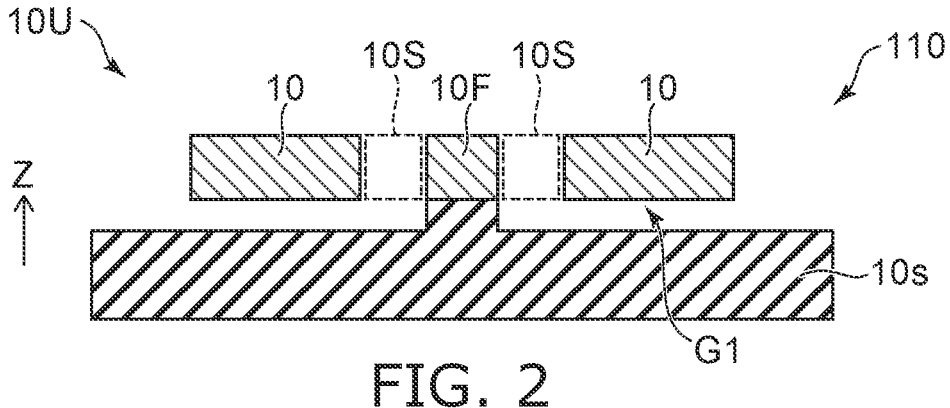
FIG. 2 is a schematic cross-sectional view illustrating the sensor according to the embodiment.

FIG. 2 is a schematic cross-sectional view illustrating the sensor according to the embodiment.

As shown in FIG. 1, a sensor 110 according to the embodiment includes a fixed member 10F, a movable member 10, a first counter electrode 21E, a second counter electrode 22E, a first resistance element R1, a second resistance element R2, and a control device 70.

As shown in FIG. 2, the fixed member 10F is fixed to the base 10s, for example. The movable member 10 is supported by the fixed member 10F. In this example, the sensor 110 includes support member 10S. The support member 10S is deformable. A portion (for example, an end) of the support member 10S is supported by the fixed member 10F. Another portion (e.g., another end) of the support member 10S supports the movable member 10. The support member 10S is, for example, a spring mechanism.

As shown in FIG. 2, a direction from the base 10s to the fixed member 10F is defined as a Z-axis direction. A gap G1 is provided between the base 10s and the movable member 10.

One direction perpendicular to the Z-axis direction is defined as an X-axis direction. A direction perpendicular to the Z-axis direction and the X-axis direction is defined as a Y-axis direction.

The fixed member 10F, the movable member 10, the first counter electrode 21E, the second counter electrode 22E, and the like are included in the sensor element 10U. The sensor element 10U is, for example, a "gyro element". In FIG. 2, the first counter electrode 21E and the second counter electrode 22E are omitted.

As shown in FIG. 1, the movable member 10 includes a first electrode 11E and a second electrode 12E. A first direction D1 from the fixed member 10F to the first electrode 11E crosses a second direction D2 from the fixed member 10F to the second electrode 12E. In one example, the first direction D1 is orthogonal to the second direction D2. The first direction D1 may be, for example, the X-axis direction. The second direction D2 may be, for example, the Y-axis direction. The first direction D1 and the second direction D2 are along the X-Y plane.

The movable member 10 is, for example, conductive. The movable member 10 may Include a plurality of electrodes 10E. The first electrode 11E and the second electrode 12E are included in the plurality of electrodes 10E.

As shown in FIG. 1, the first counter electrode 21E faces the first electrode 11E. The position of the first counter electrode 21E is fixed with respect to the fixed member 10F. For example, the first counter electrode 21E is fixed to the base 10s. The first counter electrode 21E and the first electrode 11E form a first comb-teeth electrode pair 11T.

As shown in FIG. 1, the second counter electrode 22E faces the second electrode 12E. The position of the second counter electrode 22E with respect to the fixed member 10F is fixed. For example, the second counter electrode 22E is fixed to the base 10s. The second counter electrode 22E and the second electrode 12E form a second comb-teeth electrode pair 12T.

The first resistance element R1 includes a first end ep1 and a first other end cp1. The first other end cp1 is electrically connected to the first counter electrode 21E. In this example, a wiring Lr1 electrically connects the first other end cp1 to the first counter electrode 21E. For example, the first end ep1 is electrically connected to the control device 70. In this example, the first end ep1 is electrically connected to the control device 70 via a wiring Lc1. The first resistance element R1 has a first resistance value. The first resistance value may be variable.

The second resistance element R2 includes a second end ep2 and a second other end cp2. The second other end cp2 is electrically connected to the second counter electrode 22E. In this example, a wiring Lr2 electrically connects the second other end cp2 to the second counter electrode 22E. For example, the second end ep2 is electrically connected to the control device 70. In this example, the second end ep2 is electrically connected to the control device 70 through a wiring Lc2. The second resistance element R2 has a second resistance value. The second resistance value may be variable.

The control device 70 includes a controller 74. The controller 74 includes, for example, a processor 75 and a driver 76. For example, the processing result of the processor 75 is supplied to the driver 76. The driver 76 outputs various voltages and the like based on the processing result. The various voltages include electrical signals. For example, the controller 74 is configured to apply the first voltage Vdc1 to the first end ep1 and the second voltage Vdc2 to the second end ep2.

The controller 74 is configured to perform a first correction operation in a state where the movable member 10 does not receive an external force. As will be described later, the controller 74 is configured to perform a detection operation. In the detection operation, an external force applied to the movable member 10 is detected. By performing the first correction operation, a detection operation with higher accuracy is possible.

In a first correction operation, the controller 74 causes the movable member 10 to generate a first vibration. The first vibration of the movable member 10 includes a first component in the first direction D1 and a second component in the second direction D2.

In the first correction operation, the controller 74 derives a first correction value Vx1 based on the detection result of the first component (first detection result) and the detection result of the second component (second detection result).

The first correction value Vx1 includes at least one of a first resistance correction value for the first resistance value, a second resistance correction value for the second resistance value, a first voltage correction value for the first voltage Vdc1, or a second voltage correction value for the second voltage Vdc2 such that the movable member 10 oscillates along the first direction D1.

The controller 74 derives such a first correction value Vx1 In the first correction operation. The controller 74 uses the derived correction values to correct the operating conditions for the detection operation. As a result, detection results with higher accuracy can be obtained.

In the first correction operation, the direction of the first vibration may be any direction. In one example, the direction of the first vibration can be close to the first direction D1.

For example, the shape of at least one of the first comb-teeth electrode pair 11T or the second comb-teeth electrode pair 12T may include unintended errors due to errors in the manufacturing process. Due to such errors, the vibration of the movable member 10 may include unintended errors. For example, in a state where the movable member 10 should vibrate parallel to the first direction D1, the vibration may include a component in another direction. Similarly, for example, in a state where the movable member 10 should vibrate parallel to the second direction D2, the vibration may include a component in another direction. Such other direction components may lead to inaccurate results of the sensing operation. For example, when multiple controls are performed in the detection operation, control interference may increase due to errors.

In the embodiment, the above first correction operation is performed. The first correction value Vx1 is obtained by the first correction operation. The condition of the detection operation is corrected based on the obtained first correction value Vx1. This suppresses the influence of the error even when there is an error as described above. For example, control interference can be suppressed. According to the embodiment, it is possible to provide a sensor capable of Improving accuracy.

The first correction value Vx1 may be stored in the memory 75M (see FIG. 1). The correction may be performed based on the first correction value Vx1 being stored. The memory 75M may be included in the sensor 110. The memory 75M may be provided separately from the sensor 110.

The first correction value Vx1 includes a first angle θ1 between the direction of the first vibration in the first correction operation and the first direction D1. For example, the first angle θ1 is derived based on the detection result of the first component (first detection result) and the detection result of the second component (second detection result). The derivation is performed by the controller 74, for example.

In the embodiment, the first absolute value of the angle between the direction of vibration caused by at least one of the first resistance correction value, the second resistance correction value, the first voltage correction value, or the second voltage correction value and the first direction D1 is equal to or less than the first threshold value. The vibrations (corrected vibrations) with the above various correction values derived by the first correction operation substantially are along the first direction D1. The difference between the corrected vibration direction and the first direction D1 is reduced to the first threshold value or less. For example, the influence of the error is suppressed below a threshold value. Detection with high accuracy is possible.

In the embodiment, the first electrode 11E and the second electrode 12E can be mutually replaced. The first direction D1 and the second direction D2 can be mutually replaced.

At least one of the first resistance element R1 or the second resistance element R2 is a variable resistance element. In this example, both the first resistance element R1 and the second resistance element R2 are variable resistance elements. The resistance value of the first resistance element R1 changes according to the first control signal SR1 supplied to the first resistance element R1. The resistance value of the second resistance element R2 changes according to the second control signal SR2 supplied to the second resistance element R2.

Integrated circuits, for example, may be used as the first resistance element R1 and the second resistance element R2. The first resistance element R1 and the second resistance element R2 may be provided, for example, on the base 10s to which the fixed member 10F is fixed.

In this example, a first adder SU1 is provided. One end of the line Lc1 is connected to one of the plurality of inputs of first adder SU1. The other end of the wiring Lc1 is connected to control device 70. A first AC voltage Vac1 (AC signal), which will be described later, is supplied to another one of the plurality of inputs of the first adder SU1. The first end ep1 is electrically connected to the control device 70 via the first adder SU1 and the wiring Lc1.

In this example, a second adder SU2 is provided. One end of the line Lc2 is connected to one of the plurality of inputs of the second adder SU2. The other end of the wiring Lc2 is connected to control device 70. A second AC voltage Vac2 (AC signal), which will be described later, is supplied to another one of the plurality of inputs of the second adder SU2. The second end ep2 is electrically connected to the control device 70 via the second adder SU2 and the wiring Lc2.

For example, the controller 74 is configured to supply the first voltage Vdc1 to a first input of the first adder SU1. The controller 74 is configured to supply the first AC voltage Vac1 to a second input of the first adder SU1. The controller 74 is configured to supply the second voltage Vdc2 to a third input of the second adder SU2. The controller 74 is configured to supply the second AC voltage Vac2 to a fourth input of the second adder SU2. A first output of the first adder SU1 is electrically connected to the first end ep1. A second output of the second adder SU2 is electrically connected to the second end ep2.

As shown in FIG. 1, the sensor 110 may further Include, for example, a first detection counter electrode 21sE and a second detection counter electrode 22sE. The first detection counter electrode 21sE and the second detection counter electrode 22sE are included in the sensor element 10U, for example. The movable member 10 further Includes a first detection electrode 11sE and a second detection electrode 12sE.

The first detection counter electrode 21sE faces the first detection electrode 11sE. The position of the first counter electrode for detection 21sE with respect to the fixed member 10F is fixed. For example, the first detection counter electrode 21sE is fixed to the base 10s. The first detection counter electrode 21sE and the first detection electrode 11sE form a first detection comb-teeth electrode pair 11sT.

The second detection counter electrode 22sE faces the second detection electrode 12sE. The position of the second detection counter electrode 22sE is fixed with respect to the fixed member 10F. For example, the second detection counter electrode 22sE is fixed to the base 10s. The second detection counter electrode 22sE and the second detection electrode 12sE form a second detection comb-teeth electrode pair 12sT.

The fixed member 10F is provided between the first electrode 11E and the first detection electrode 11sE in the first direction D1. The fixed member 10F is provided between the second electrode 12E and the second detection electrode 12sE in the second direction D2.

For example, the capacitance between the first detection counter electrode 21sE and the first detection electrode 11sE changes according to the vibration of the movable member 10. For example, the capacitance between the second detection counter electrode 22sE and the second detection electrode 12sE changes according to the vibration of the movable member 10. A value corresponding to the change in capacitance can be detected.

As shown in FIG. 1, the control device 70 includes a first detection section 71 and a second detection section 72. The first detection section 71 is electrically connected to the first detection counter electrode 21sE. The second detection section 72 is electrically connected to the second detection counter electrode 22sE. The first detection section 71 and the second detection section 72 are included in a detection section 70s. For example, by using a differential circuit or the like, the operations of the first detection section 71 and the second detection section 72 may be performed by one detection section. To simplify the explanation, an example in which two detection sections are provided will be explained below.

The first detection section 71, for example, applies the first detection voltage Vs1 to the first detection counter electrode 21sE. A signal corresponding to the amplitude of the vibration along the first direction D1 is detected by capacitive coupling between the first detection counter electrode 21sE and the first detection electrode 11sE. The second detection section 72, for example, applies the second detection voltage Vs2 to the second detection counter electrode 22sE. A signal corresponding to the amplitude of the vibration along the second direction D2 is detected by capacitive coupling between the second detection counter electrode 22sE and the second detection electrode 12sE.

Thus, the first detection section 71 is configured to detect the first amplitude of the first component of the vibration of the movable member 10 along the first direction D1. The second detection section 72 is configured to detect the second amplitude of the second component of the vibration of the movable member 10 along the second direction D2.

The controller 74 acquires the first component from the first detection section 71 and acquires the second component from the second detection section 72. Based on the first component obtained from the first detection section 71 and the second component obtained from the second detection section 72, the first correction operation and detection operation are performed.

The processor 75 may, for example, include an angle derivation section 75c. The first component and the second component detected by the first detection section 71 and the second detection section 72 are supplied to the angle derivation section 75c of the processor 75. The angle derivation section 75c derives an angle $\theta$ (rotational angle) of the vibration of the movable member 10 from the first component and the second component. Based on the angle $\theta$ being derived, the first correction operation is performed. For example, the difference between the angle $\theta$ being derived and the first direction D1 corresponds to the first angle $\theta 1$.

As shown in FIG. 1, the first correction value Vx1 derived by the first correction operation is supplied to the driver 76. The driver 76 includes, for example, a first control signal output section DR1, a second control signal output section DR2, a first voltage output section Ddc1, and a second voltage output section Ddc2. The first control signal output section DR1 supplies the first control signal SR1 to the first resistance element R1. The second control signal output section DR2 supplies the second control signal SR2 to the second resistance element R2. The first voltage output section Ddc1 controls the first voltage Vdc1 of the first end ep1 of the first resistance element R1. The second voltage output section Ddc2 controls the second voltage Vdc2 of the second end ep2 of the second resistance element R2. The first voltage Vdc1 and the second voltage Vdc2 include a direct current component.

For example, a correction value (first correction value Vx1) is supplied to the first control signal output section DR1, the second control signal output section DR2, the first voltage output section Ddc1, and the second voltage output section Ddc2. Thus, the first control signal SR1 being corrected, the second control signal SR2 being corrected, the first voltage Vdc1 being corrected, and the second voltage Vdc2 being corrected are supplied to the sensor element 10U.

In the control operation, the first correction value Vx1 may include at least one of the first resistance value or the second resistance value such that the movable member 10 vibrates along the first direction D1. In this case, the first correction value Vx1 does not need to be supplied to the first voltage output section Ddc1 and the second voltage output section Ddc2.

For example, a capacitive element is formed by the first electrode 11E and the first counter electrode 21E. The first resistance element R1 is connected in series with the capacitive element. For example, a first variable electric damper is formed by the first electrode 11E, the first counter electrode 21E, and the first resistance element R1. For example, the first voltage Vdc1 may change the capacitance of the capacitive element formed by the first electrode 11E and the first counter electrode 21E. For example, the first variable electric damper is formed by the first electrode 11E, the first counter electrode 21E, the first resistance element R1 and the first voltage Vdc1.

For example, a capacitive element is formed by the second electrode 12E and the second counter electrode 22E. The second resistance element R2 is connected in series with the capacitive element. The second variable electric damper, for example, is formed by the second electrode 12E, the second counter electrode 22E, and the second resistance element R2. For example, the second voltage Vdc2 may change the capacitance of the capacitive element formed by the second electrode 12E and the second counter electrode 22E. For example, the second variable electric damper is formed by the second electrode 12E, the second counter electrode 22E, the second resistance element R2 and the second voltage Vdc2.

These variable electric dampers are configured to change the vibration characteristics of the movable member 10. In the first correction operation, it is possible to correct the characteristics of these variable electric dampers.

As shown in FIG. 1, the sensor 110 may include a first counter conductive portion 21C and a second counter conductive portion 22C. The movable member 10 may further include a first conductive portion 11C and a second conductive portion 12C.

The first counter conductive portion 21C faces the first conductive portion 11C. The position of the first counter conductive portion 21C is fixed with respect to the fixed member 10F. For example, the first counter conductive portion 21C is fixed to the base 10s. For example, the first counter conductive portion 21C and the first conductive portion 11C form the first parallel plate electrode pair 11P.

The second counter conductive portion 22C faces the second conductive portion 12C. The position of the second counter conductive portion 22C is fixed with respect to the fixed member 10F. For example, the second counter conductive portion 22C is fixed to the base 10s. For example, the second counter conductive portion 22C and the second conductive portion 12C form the second parallel plate electrode pair 12P.

A third direction D3 from the fixed member 10F to the first conductive portion 11C crosses the first direction D1 and the second direction D2. A fourth direction D4 from the fixed member 10F to the second conductive portion 12C crosses the first direction D1 and the second direction D2. The fourth direction D4 crosses the third direction D3. The third direction D3 and the fourth direction D4 are along a plane including the first direction D1 and the second direction D2.

In the embodiment, the controller 74 is configured to apply the first counter conductive portion voltage Vp1 to the first counter conductive portion 21C. The controller 74 is configured to apply the second counter conductive portion voltage Vp2 to the second counter conductive portion 22C.

In the embodiment, a second correction operation described below may be performed. For example, the controller 74 is configured to further perform the second correction operation when the movable member 10 does not receive an external force. In the second correction operation, the controller 74 generates a second vibration in the movable member 10. The second vibration includes a third component in the third direction D3 and a fourth component in the fourth direction D4. In the second correction operation, the controller 74 may derive a second correction value Vx2 based on the third direction detection result of the third component and the fourth direction detection result of the fourth component (see FIG. 1). The second correction value Vx2 includes at least one of a first counter conductive portion voltage correction value for the first counter conductive portion voltage Vp1 and a second counter conductive portion voltage correction value for the second counter conductive portion voltage Vp2 such that the movable member 10 vibrates along the third direction D3.

The second correction value Vx2 includes, for example, a second angle θ2 (see FIG. 1) of a difference between the direction of the second vibration and the third direction D3. For example, the second correction operation based on the deviation (second angle θ2) from the third direction D3 in the direction of the second vibration is performed.

For example, the shape of at least one of the first parallel plate electrode pair 11P or the second parallel plate electrode pair 12P may include an unintended error due to an error in the manufacturing process or the like. The unintended errors can make the operation using these parallel plate electrode pairs inaccurate.

In the embodiment, the second correction operation is performed. The second correction value Vx2 is obtained by the second correction operation. Based on the second correction value Vx2 being obtained, the operating condition using the parallel plate electrode pair is corrected. Thus, the influence of the error is suppressed. According to the embodiment, a sensor capable of Improving accuracy can be provided.

For example, the operation using the parallel plate electrode pair Includes, for example, a resonance frequency correction operation. The controller 74 is configured to perform a resonance frequency correction operation. In the resonance frequency correction operation, the controller 74 is configured to adjust at least one of the first counter conductive portion voltage Vp1 or the second counter conductive portion voltage Vp2 such that the second absolute value of the difference between the third resonance frequency of the third component and a fourth resonance frequency of the fourth component becomes small.

For example, by the second correction operation based on the second correction value Vx2 (For example, the second angle θ2), at least one of the first counter conductive portion voltage Vp1 and the second counter conductive portion voltage Vp2 is adjusted by correcting the deviation of the resonance frequency. More accurate detection is possible.

As shown in FIG. 1, for example, the driver 76 may include a first control voltage output section Dp1 and a second control voltage output section Dp2. The first control voltage output section Dp1 is connected to the first counter conductive portion 21C by the wiring Lp1, for example. The second control voltage output section Dp2 is connected to the second counter conductive portion 22C by the wiring Lp2, for example. The first control voltage output section Dp1 applies the first counter conductive portion voltage Vp1 to the first counter conductive portion 21C. The second control voltage output section Dp2 applies the second counter conductive portion voltage Vp2 to the second counter conductive portion 22C.

As shown in FIG. 1, the processor 75 may include a resonance frequency adjusting section 75b. The first component obtained from the first detection section 71 and the second component obtained from the second detection section 72 are supplied to the resonance frequency adjusting section 75b. The resonance frequency adjusting section 75b controls at least one of the first control voltage output section Dp1 and the second control voltage output section Dp2 to control the first counter conductive portion voltage Vp1 and the second counter conductive portion voltage Vp2. At this time, at least one of the first counter conductive portion voltage Vp1 being corrected and the second counter conductive portion voltage Vp2 being corrected may be supplied to the sensor element 10U.

For example, the direction of displacement of the movable member 10 when the first counter conductive portion voltage Vp1 changes crosses the direction of displacement of the movable member 10 when the second counter conductive portion voltage Vp2 changes. By the plurality of variable electric springs corresponding to the plurality of directions of the displacement, the resonance frequency can be controlled in any direction.

As shown in FIG. 1, in the embodiment, the second correction value Vx2 may be supplied to the first control voltage output section Dp1 and the second control voltage output section Dp2. Accordingly, the first counter conductive portion voltage Vp1 being corrected and the second counter conductive portion voltage Vp2 being corrected can be supplied to the sensor element 10U. For example, the resonance frequency control is corrected. The resonance frequency can be controlled with higher accuracy.

Thus, the controller 74 is configured to adjust at least one of the first counter conductive portion voltage Vp1 of the first counter conductive portion 21C or the second counter conductive portion voltage Vp2 of the second counter conductive portion 22C based on the second correction value Vx2.

As shown in FIG. 1, the driver 76 may include a first AC voltage output section Dac1 and a second AC voltage output section Dac2. The first AC voltage Vac1 is output from the first AC voltage output section Dac1. The first AC voltage Vac1 is applied to the first end ep1 of the first resistance element R1 via the first adder SU1. The first AC voltage Vac1 is applied to the first counter electrode 21E via the first resistance element R1. An AC component of the first AC voltage Vac1 is applied between the first counter electrode 21E and the first electrode 11E. Thus, the movable member 10 vibrates along one direction, for example, according to the first AC voltage Vac1. The vibration direction includes, for example, a component in the first direction D1.

The second AC voltage Vac2 is output from the second AC voltage output section Dac2. The second AC voltage Vac2 is applied to the second end ep2 of the second resistance element R2 via the second adder SU2. The second AC voltage Vac2 is applied to the second counter electrode 22E via the second resistance element R2. An AC component of the second AC voltage Vac2 is applied between the second counter electrode 22E and the second electrode 12E. Thus, the movable member 10 vibrates along another direction, for example, according to the second AC voltage Vac2. The vibration direction includes, for example, a component in the second direction D2.

For example, in the first correction operation, the movable member 10 is vibrated by the first AC voltage output section Dac1 and the second AC voltage output section Dac2. By detecting this vibration, the first correction value Vx1 can be derived.

In the detection operation as well, the movable member 10 is vibrated by the first AC voltage output section Dac1 and the second AC voltage output section Dac2. For example, the controller 74 is configured to perform the detection operation. In the detection operation, the controller 74 applies the first AC voltage Vac1 between the first electrode 11E and the first counter electrode 21E and applies the second AC voltage Vac2 between the second electrode 12E and the second counter electrode 22E to vibrate the movable member 10.

The controller 74 is configured to detect the external force based on the change of the first component and the second component of the vibration when the movable member 10 receives the external force in the detection operation.

The controller 74 corrects the vibration of the movable member 10 based on the first correction value Vx1 in the detection operation. In the detection operation, the controller 74 supplies, for example, the first control signal SR1 being corrected, the second control signal SR2 being corrected, the first voltage Vdc1 being corrected, and the second voltage Vdc2 being corrected to the sensor element 10U. The controller 74 supplies, for example, the first counter conductive portion voltage Vp1 being corrected and the second counter conductive portion voltage Vp2 being corrected to the sensor element 10U. Detection with high accuracy is possible.

In the first correction operation and the detection operation, the direction of displacement of the movable member 10 when the first voltage Vdc1 changes crosses the direction of displacement of the movable member 10 when the second voltage Vdc2 changes.

In the embodiment, for example, the first component and second component of the vibration when the movable member 10 receives an external force may include a component of the Coriolis force based on the rotational angular velocity acting on the movable member 10. The degree of the component of Coriolis force is detected. Thereby, the rotational angular velocity acting on the movable member 10 may be detected.

For example, when the movable member 10 vibrating rotates by an external force or the like, the vibration state changes. The change of the vibration state is considered to be caused by the action of Coriolis force, for example. For example, the movable member 10 vibrates by a spring mechanism (e.g., the support member 10S). The Coriolis force by angular velocity Ω of rotation acts on the movable member 10 vibrating in the first direction D1. As a result, a component of vibration along the second direction D2 is generated in the movable member 10. The second detection section 72 detects the amplitude of the vibration along the second direction D2. On the other hand, The Coriolis force due to angular velocity Ω of rotation acts on the movable member 10 vibrating in the second direction D2. As a result, a component of vibration along the first direction D1 is generated in the movable member 10. The first detection section 71 detects the amplitude of the vibration along the first direction D1. For example, the amplitude of the first component in the first direction D1 is defined as "Ax", and the amplitude of the second component in the second direction D2 is defined as "Ay". The angle θ (rotation angle) corresponds to $\tan^{-1}$ (−Ay/Ax), for example.

The controller 74 acquires the first component from the first detection section 71 and acquires the second component from the second detection section 72. A signal (signal Sig0) corresponding to the angle θ (rotation angle) may be output from the controller 74 by the operation performed by the controller 74.

As described above, in the detection operation, the movable member 10 vibrates on an elliptical orbit. The elliptical orbit includes a first length x1 in the long axis direction of the elliptical orbit and a second length x2 in the short axis direction of the elliptical orbit. The first value E is $(x1)^2 + (x2)^2$. The second value Q is the product of x1 and x2.

The controller 74 may perform a first control operation and a second control operation. In the first control operation, the controller 74 obtains the first value E and supplies the first driving force to the movable member 10 to keep the first value E constant. In the second control operation, the controller 74 obtains the second value Q and supplies the second driving force to the movable member 10 to keep the second value Q constant. By such an operation, information on the resonance frequency may be obtained.

In the embodiment, the controller 74 may further perform a time constant correction operation. In the time constant correction operation, the controller 74 changes at least one of the first resistance value, the second resistance value, the first voltage Vdc1, or the second voltage Vdc2 such that a third absolute value of the difference between a first time constant of the first component of the first direction D1 of the vibration and the second time constant of the second direction D2 second component of the vibration becomes small.

As shown in FIG. 1, for example, the processor 75 may include a time constant adjusting section 75a. The first component obtained from the first detection section 71 and the second component obtained from the second detection section 72 are supplied to the time constant adjusting section 75a. The time constant adjusting section 75a controls at least one of the first control signal output section DR1, the second control signal output section DR2, the first voltage output section Ddc1, or the second voltage output section Ddc2 to change at least one of the first resistance value, the second resistance value, the first voltage Vdc1, or the second voltage Vdc2. At this time, at least one of the first resistance value being corrected, the second resistance value being corrected, the first voltage Vdc1 being corrected, or the second voltage Vdc2 being corrected may be supplied to the sensor element 10U.

In the embodiment, the controller 74 may further perform a temperature correction operation. For example, the third absolute value (absolute value of the difference between the first time constant of the first component of the vibration and the second time constant of the second component of the vibration) is changed by a temperature change. The controller 74 is configured to correct the change of the third absolute value due to the temperature change.

Second Embodiment

In the second embodiment, the first correction operation may include the following variations. For example, in the first correction operation, the first correction value Vx1 may further include at least one of a first counter conductive portion voltage correction value for the first counter conductive portion voltage Vp1 or a second counter conductive portion voltage correction value for the second counter conductive portion voltage Vp2 such that the movable member 10 oscillates along the first direction D1.

For example, as described above, when the first correction operation is based on the vibration of the first electrode 11E and the second electrode 12E, the first absolute value of the angle between the direction of the vibration after the correction and the first direction D1 is equal to or less than the first threshold value. In this case, the first absolute value of the angle between the direction of the corrected vibration and the first direction D1 may not be sufficiently small. In this case, the correction of the first counter conductive portion voltage Vp1 and the correction of the second counter conductive portion voltage Vp2 may be further performed. In this way, it is also possible to perform more accurate correction.

In such a deformation of the first correction operation, for example, the absolute value of the angle between the direction of vibration due to at least one of the first counter conductive portion voltage correction value or the second counter conductive portion voltage correction value and the first direction D1 can be smaller than the first threshold value. For example, the difference in the angle from the first direction D1 can be made smaller.

As described above, in the first correction operation, the movable member 10 may vibrate along the first direction D1 with higher accuracy by correcting at least one of the first counter conductive portion voltage Vp1 or the second counter conductive portion voltage Vp2.

The embodiments may include the following configurations (e.g., technical proposals).

Configuration 1

A sensor, comprising:

a fixed member;

a movable member supported by the fixed member, the movable member including a first electrode and a second electrode, a first direction from the fixed member to the first electrode crossing a second direction from the fixed member to the second electrode;

a first counter electrode facing the first electrode, a position of the first counter electrode with respect to the fixed member being fixed, the first counter electrode and the first electrode forming a first comb-teeth electrode pair;

a second counter electrode facing the second electrode, a position of the second counter electrode with respect to the fixed member being fixed, the second counter electrode and the second electrode forming a second comb-teeth electrode pair;

a first resistance element including a first end and a first other end, the first other end being electrically connected to the first counter electrode, the first resistance element having a first resistance value;

a second resistance element including a second end and a second other end, the second other end being electrically connected to the second counter electrode, the second resistance element having a second resistance value; and a control device including a controller, the controller being configured to apply a first voltage to the first end and a second voltage to the second end, the controller being configured to perform a first correction operation in a state where the movable member does not receive an external force, in the first correction operation, the controller being configured to cause the movable member to generate a first vibration, the first vibration including a first component in the first direction and a second component in the second direction, in the first correction operation, the controller being configured to derive a first correction value based on a first detection result of the first component and a second detection result of the second component, and the first correction value including at least one of a first resistance correction value for the first resistance value, a second resistance correction value for the second resistance value, a first voltage correction value for the first voltage, or a second voltage correction value for the second voltage such that the movable member vibrates along the first direction.

Configuration 2

The sensor according to Configuration 1, wherein the first correction value includes a first angle between a direction of the first vibration and the first direction.

Configuration 3

The sensor according to Configuration 2, wherein a first absolute value of an angle between a direction of a vibration due to at least one of the first resistance correction value, the second resistance correction value, the first voltage correction value, or the second voltage correction value, and the first direction is equal to or less than a first threshold value.

Configuration 4

The sensor according to any one of Configurations 1-3, further comprising:

a first detection counter electrode; and a second detection counter electrode, the movable member further including a first detection electrode and a second detection electrode, the first detection counter electrode facing the first detection electrode, a position of the first detection counter electrode with respect to the fixed member being fixed, the first detection counter electrode and the first detection electrode forming a first detection comb-teeth electrode pair, the second detection counter electrode facing the second detection electrode, a position of the second detection counter electrode with respect to the fixed member being fixed, the second detection counter electrode and the second detection electrode forming a second detection comb-teeth electrode pair, the fixed member being provided between the first electrode and the first detection electrode in the first direction, and the fixed member being provided between the second electrode and the second detection electrode in the second direction.

Configuration 5

The sensor according to Configuration 4, wherein the control device includes

14 a first detection section configured to detect a first amplitude of the first component, and a second detection section configured to detect a second amplitude of the second component, and the controller is configured to acquire the first component from the first detection section and to acquire the second component from the second detection section.

Configuration 6

The sensor according to Configuration 3, further comprising:

a first counter conductive portion; and a second counter conductive portion, the movable member further Including a first conductive portion and a second conductive portion, the first counter conductive portion facing the first conductive portion, a position of the first counter conductive portion with respect to the fixed member being fixed, the second counter conductive portion facing the second conductive portion, a position of the second counter conductive portion with respect to the fixed member being fixed, a third direction from the fixed member to the first conductive portion crossing the first direction and the second direction, a fourth direction from the fixed member to the second conductive portion crossing the first direction and the second direction, and crossing the third direction, and the third direction and the fourth direction being along a plane including the first direction and the second direction.

Configuration 7

The sensor according to Configuration 6, wherein the controller is configured to apply a first counter conductive portion voltage to the first counter conductive portion, and to apply a second counter conductive portion voltage to the second counter conductive portion, the controller is configured to further perform a second correction operation in a state where the movable member does not receive the external force, in the second correction operation, the controller is configured to causes the movable member to generate a second vibration, the second vibration includes a third component in the third direction and a fourth component in the fourth direction, in the second correction operation, the controller is configured to derive a second correction value based on a third direction detection result of the third component and a fourth direction detection result of the fourth component, and the second correction value includes at least one of a first counter conductive portion voltage correction value for the first counter conductive portion voltage and a second counter conductive portion voltage correction value for the second counter conductive portion voltage such that the movable member vibrates along the third direction.

Configuration 8

The sensor according to Configuration 7, wherein the controller is configured to perform a resonance frequency correction operation, and in the resonance frequency correction operation, the controller is configured to adjust at least one of the first counter conductive portion voltage or the second counter conductive portion voltage such that a second absolute value of a difference between a third resonance frequency of the third component and a fourth resonance frequency of the fourth component becomes small.

Configuration 9

The sensor according to Configuration 6, wherein the controller is configured to apply a first counter conductive portion voltage to the first counter conductive portion, and can apply a second counter conductive portion voltage to the second counter conductive portion, and the first correction value further includes at least one of a first counter conductive portion voltage correction value for the first counter conductive portion voltage and a second counter conductive portion voltage correction value for the second counter conductive portion voltage.

Configuration 10

The sensor according to Configuration 9, wherein an absolute value of the angle between a direction of a vibration caused by at least one of the first counter conductive portion voltage correction value and the second counter conductive portion voltage and the first direction is less than the first threshold.

Configuration 11

The sensor according to any one of Configurations 6-10, wherein the first counter conductive portion and the first conductive portion form a first parallel plate electrode pair, and the second counter conductive portion and the second conductive portion form a second parallel plate electrode pair.

Configuration 12

The sensor according to any one of Configurations 1-11, wherein the controller is configured to further perform a detection operation, in the detection operation, the controller is configured to apply a first AC voltage between the first electrode and the first counter electrode and to apply a second AC voltage between the second electrode and the second counter electrode to vibrate the movable member, and the controller is configured to detect the external force based on a change of the first component and the second component when the movable member receives the external force in the detection operation.

Configuration 13

The sensor according to Configuration 12, wherein the controller is configured to correct a vibration of the movable member based on the first correction value in the detection operation.

Configuration 14

The sensor according to Configuration 13, wherein the first component and the second component when the movable member receives the external force include a component of a Coriolis force based on a rotational angular velocity acting on the movable member.

Configuration 15

The sensor according to any one of Configurations 12-14, wherein in the detection operation, the movable member oscillates in an elliptical orbit, the elliptical orbit includes a first length x1 in a long axis direction of the elliptical orbit and a second length x2 in a short axis direction of the elliptical orbit, a first value E is $(x1)^2+(x2)^2$, a second value Q is a product of x1 and x2, the controller is configured to perform a first control operation and a second control operation, in the first control operation, the controller is configured to obtain the first value E and to supply a first driving force to the movable member to keep the first value E constant, and in the second control operation, the controller is configured to obtain the second value Q and to supply a second driving force to the movable member to keep the second value Q constant.

Configuration 16

The sensor according to any one of Configurations 12-15, wherein the controller is configured to further perform a time constant correction operation, and the controller is configured to change at least one of the first resistance value, the second resistance value, the first voltage, or the second voltage such that a third absolute value of a difference between the first time constant of the first component and the second time constant of the second component is small.

Configuration 17

The sensor according to Configuration 16, wherein the third absolute value changes with a temperature change, and the controller is configured to correct a change in the third absolute value due to the temperature change.

Configuration 18

The sensor according to any one of Configurations 1-17, further comprising:

a support member being deformable, a portion of the support member being supported by the fixed member, and another portion of the support member supporting the movable member.

Configuration 19

The sensor according to any one of Configurations 1-10, further comprising:

a first adder; and a second adder, the controller being configured to supply the first voltage to a first input of the first adder, the controller being configured to supply a first AC voltage to a second input of the first adder, the controller being configured to supply the second voltage to a third input of the second adder, the controller being configured to supply a second AC voltage to a fourth input of the second adder, a first output of the first adder being electrically connected to the first end, and a second output of the second adder being electrically connected to the second end.

Configuration 20

The sensor, comprising:

a fixed member:

a movable member supported by the fixed member, the movable member including a first conductive portion and a second conductive portion, a third direction from the fixed member to the first conductive portion crossing a fourth direction from the fixed member to the second conductive portion;

a first counter conductive portion facing the first conductive portion, a position of the first counter conductive portion with respect to the fixed member being fixed, the first counter conductive portion and the first conductive portion forming a first parallel plate electrode pair;

a second counter conductive portion facing the second conductive portion, a position of the second counter conductive portion with respect to the fixed member being fixed, the second counter conductive portion and the second conductive portion forming a second parallel plate electrode pair; and a control device including a controller, the controller being configured to apply a first counter conductive portion voltage to the first counter conductive portion, and to apply a second counter conductive portion voltage to the second counter conductive portion, the controller being configured to perform a second correction operation in a state where the movable member does not receive an external force, in the second correction operation, the controller being configured to generate a second vibration in the movable member, the second vibration including a third direction component in the third direction and a fourth direction component in the fourth direction, in the second correction operation, the controller being configured to derive a second correction value based on a third direction detection result of the third direction component and a fourth direction detection result of the fourth direction component, and the second correction value including at least one of a first counter conductive portion voltage correction value for the first counter conductive portion voltage and a second counter conductive portion voltage correction value for the second counter conductive portion voltage such that the movable member vibrates along the third direction.

According to the embodiments, it is possible to provide a sensor capable of Improving accuracy.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as movable members, electrodes, conductive portions, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors practicable by an appropriate design modification by one skilled in the art based on the sensors described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:

a fixed member;

a movable member supported by the fixed member, the movable member including a first electrode and a second electrode, a first direction from the fixed member to the first electrode crossing a second direction from the fixed member to the second electrode;

a first counter electrode facing the first electrode, a position of the first counter electrode with respect to the fixed member being fixed, the first counter electrode and the first electrode forming a first comb-teeth electrode pair;

a second counter electrode facing the second electrode, a position of the second counter electrode with respect to the fixed member being fixed, the second counter electrode and the second electrode forming a second comb-teeth electrode pair;

a first resistance element including a first end and a first other end, the first other end being electrically connected to the first counter electrode, the first resistance element having a first resistance value;

a second resistance element including a second end and a second other end, the second other end being electrically connected to the second counter electrode, the second resistance element having a second resistance value; and a control device including a controller, the controller being configured to apply a first voltage to the first end and a second voltage to the second end, the controller being configured to perform a first correction operation in a state where the movable member does not receive an external force, in the first correction operation, the controller being configured to cause the movable member to generate a first vibration, the first vibration including a first component in the first direction and a second component in the second direction, in the first correction operation, the controller being configured to derive a first correction value based on a first detection result of the first component and a second detection result of the second component, and the first correction value including at least one of a first resistance correction value for the first resistance value, a second resistance correction value for the second resistance value, a first voltage correction value for the first voltage, or a second voltage correction value for the second voltage such that the movable member vibrates along the first direction, wherein the first correction value includes a first angle between a direction of the first vibration and the first direction, and a first absolute value of an angle between a direction of a vibration due to at least one of the first resistance correction value, the second resistance correction value, the first voltage correction value, or the second voltage correction value, and the first direction is equal to or less than a first threshold value.

2. The sensor according to claim 1, further comprising:

a first detection counter electrode; and a second detection counter electrode, the movable member further including a first detection electrode and a second detection electrode, the first detection counter electrode facing the first detection electrode, a position of the first detection counter electrode with respect to the fixed member being fixed, the first detection counter electrode and the first detection electrode forming a first detection comb-teeth electrode pair, the second detection counter electrode facing the second detection electrode, a position of the second detection counter electrode with respect to the fixed member being fixed, the second detection counter electrode and the second detection electrode forming a second detection comb-teeth electrode pair, the fixed member being provided between the first electrode and the first detection electrode in the first direction, and the fixed member being provided between the second electrode and the second detection electrode in the second direction.

3. The sensor according to claim 2, wherein the control device includes a first detection section configured to detect a first amplitude of the first component, and a second detection section configured to detect a second amplitude of the second component, and the controller is configured to acquire the first component from the first detection section and to acquire the second component from the second detection section.

4. The sensor according to claim 1, further comprising:

a first counter conductive portion; and a second counter conductive portion, the movable member further including a first conductive portion and a second conductive portion, the first counter conductive portion facing the first conductive portion, a position of the first counter conductive portion with respect to the fixed member being fixed, the second counter conductive portion facing the second conductive portion, a position of the second counter conductive portion with respect to the fixed member being fixed, a third direction from the fixed member to the first conductive portion crossing the first direction and the second direction, a fourth direction from the fixed member to the second conductive portion crossing the first direction and the second direction, and crossing the third direction, and the third direction and the fourth direction being along a plane including the first direction and the second direction.

5. The sensor according to claim 4, wherein the controller is configured to apply a first counter conductive portion voltage to the first counter conductive portion, and to apply a second counter conductive portion voltage to the second counter conductive portion, the controller is configured to further perform a second correction operation in a state where the movable member does not receive the external force, in the second correction operation, the controller is configured to causes the movable member to generate a second vibration, the second vibration includes a third component in the third direction and a fourth component in the fourth direction, in the second correction operation, the controller is configured to derive a second correction value based on a third direction detection result of the third component and a fourth direction detection result of the fourth component, and the second correction value includes at least one of a first counter conductive portion voltage correction value for the first counter conductive portion voltage and a second counter conductive portion voltage correction value for the second counter conductive portion voltage such that the movable member vibrates along the third direction.

6. The sensor according to claim 5, wherein the controller is configured to perform a resonance frequency correction operation, and in the resonance frequency correction operation, the controller is configured to adjust at least one of the first counter conductive portion voltage or the second counter conductive portion voltage such that a second absolute value of a difference between a third resonance frequency of the third component and a fourth resonance frequency of the fourth component becomes small.

7. The sensor according to claim 4, wherein the controller is configured to apply a first counter conductive portion voltage to the first counter conductive portion, and apply a second counter conductive portion voltage to the second counter conductive portion, and the first correction value further includes at least one of a first counter conductive portion voltage correction value for the first counter conductive portion voltage and a second counter conductive portion voltage correction value for the second counter conductive portion voltage.

8. The sensor according to claim 7, wherein an absolute value of the angle between a direction of a vibration caused by at least one of the first counter conductive portion voltage correction value and the second counter conductive portion voltage and the first direction is less than the first threshold.

9. The sensor according to claim 4, wherein the first counter conductive portion and the first conductive portion form a first parallel plate electrode pair, and the second counter conductive portion and the second conductive portion form a second parallel plate electrode pair.

10. The sensor according to claim 1, wherein the controller is configured to further perform a detection operation, in the detection operation, the controller is configured to apply a first AC voltage between the first electrode and the first counter electrode and to apply a second AC voltage between the second electrode and the second counter electrode to vibrate the movable member, and the controller is configured to detect the external force based on a change of the first component and the second component when the movable member receives the external force in the detection operation.

11. The sensor according to claim 10, wherein the controller is configured to correct a vibration of the movable member based on the first correction value in the detection operation.

12. The sensor according to claim 11, wherein the first component and the second component when the movable member receives the external force include a component of a Coriolis force based on a rotational angular velocity acting on the movable member.

13. The sensor according to claim 10, wherein in the detection operation, the movable member oscillates in an elliptical orbit, the elliptical orbit includes a first length x1 in a long axis direction of the elliptical orbit and a second length x2 in a short axis direction of the elliptical orbit, a first value E is $(x1)^2 + (x2)^2$, a second value Q is a product of x1 and x2, the controller is configured to perform a first control operation and a second control operation, in the first control operation, the controller is configured to obtain the first value E and to supply a first driving force to the movable member to keep the first value E constant, and in the second control operation, the controller is configured to obtain the second value Q and to supply a second driving force to the movable member to keep the second value Q constant.

14. The sensor according to claim 10, wherein the controller is configured to further perform a time constant correction operation, and the controller is configured to change at least one of the first resistance value, the second resistance value, the first voltage, or the second voltage such that a third absolute value of a difference between a first time constant of the first component and a second time constant of the second component is small.

15. The sensor according to claim 14, wherein the third absolute value changes with a temperature change, and the controller is configured to correct a change in the third absolute value due to the temperature change.

16. The sensor according to claim 1, further comprising:

a support member being deformable, a portion of the support member being supported by the fixed member, and another portion of the support member supporting the movable member.

17. The sensor according to claim 1, further comprising:

a first adder; and a second adder, the controller being configured to supply the first voltage to a first input of the first adder, the controller being configured to supply a first AC voltage to a second input of the first adder, the controller being configured to supply the second voltage to a third input of the second adder, the controller being configured to supply a second AC voltage to a fourth input of the second adder, a first output of the first adder being electrically connected to the first end, and a second output of the second adder being electrically connected to the second end.

18. A sensor, comprising:

a fixed member:

a movable member supported by the fixed member, the movable member including a first conductive portion and a second conductive portion, a third direction from the fixed member to the first conductive portion crossing a fourth direction from the fixed member to the second conductive portion;

a first counter conductive portion facing the first conductive portion, a position of the first counter conductive portion with respect to the fixed member being fixed, the first counter conductive portion and the first conductive portion forming a first parallel plate electrode pair;

a second counter conductive portion facing the second conductive portion, a position of the second counter conductive portion with respect to the fixed member being fixed, the second counter conductive portion and the second conductive portion forming a second parallel plate electrode pair; and a control device including a controller, the controller being configured to apply a first counter conductive portion voltage to the first counter conductive portion, and to apply a second counter conductive portion voltage to the second counter conductive portion, the controller being configured to perform a second correction operation in a state where the movable member does not receive an external force, in the second correction operation, the controller being configured to generate a second vibration in the movable member, the second vibration including a third direction component in the third direction and a fourth direction component in the fourth direction, in the second correction operation, the controller being configured to derive a second correction value based on a third direction detection result of the third direction component and a fourth direction detection result of the fourth direction component, and the second correction value including at least one of a first counter conductive portion voltage correction value for the first counter conductive portion voltage and a second counter conductive portion voltage correction value for the second counter conductive portion voltage such that the movable member vibrates along the first third direction, wherein the second correction value includes a second angle of a difference between the direction of the second vibration and the third direction, and the second correction operation is performed based on the second angle.

\* \* \* \* \*